M. M. & F. MARTIN.
Car Seat.
No. 57,351.  Patented Aug. 21, 1866.
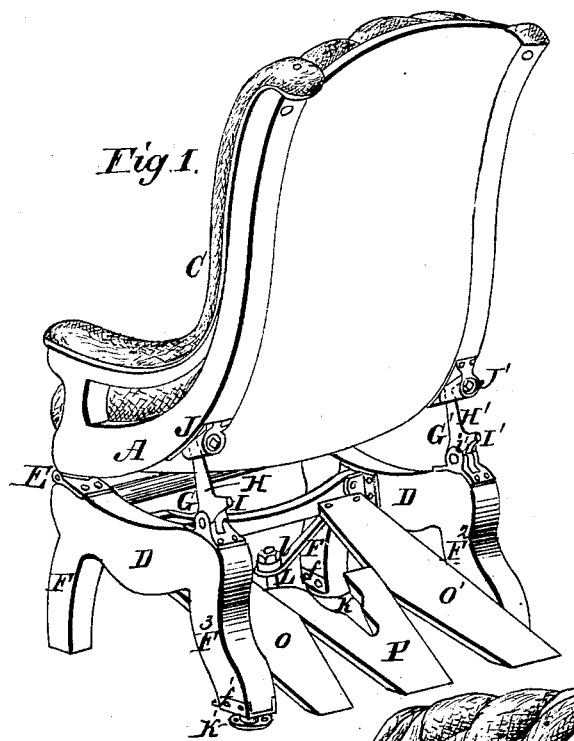
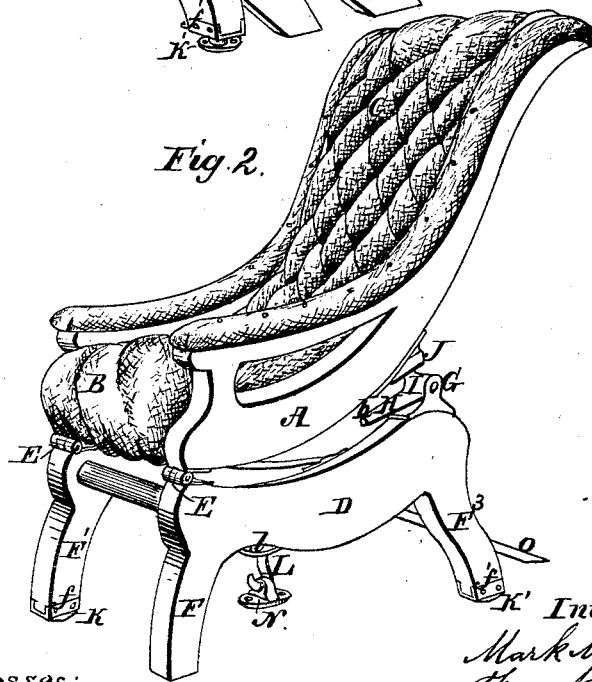
Witnesses:  Inventors:

UNITED STATES PATENT OFFICE.

MARK M. MARTIN AND FRANK MARTIN, OF AURORA, INDIANA.

IMPROVED RAILROAD-CAR SEAT.

Specification forming part of Letters Patent No. 57,351, dated August 21, 1866.

*To all whom it may concern:*

Be it known that we, MARK M. MARTIN and FRANK MARTIN, both of Aurora, Dearborn county, and State of Indiana, have invented certain new and useful Improvements in Railroad-Car Seats; and we do hereby declare the following to be a full, clear, and exact description thereof, reference being had to the accompanying drawings, making part of this specification.

Travelers who journey any distance on railroad-cars soon become fatigued by constantly sitting in one constrained position, which they are compelled to do when occupying the customary seats now in use; and our improvement has been designed to obviate this great objection to railroad traveling, and to furnish a seat in which the occupant can recline in the most comfortable and easy position.

The first part of our invention relates to a peculiarly-constructed car-seat, which can be used as an ordinary one, or may be so inclined as to enable the occupant to change to a more comfortable position; and the second part of our invention relates to certain devices for securing the seat in either of the described positions, so that it cannot be displaced either by the motion of the car or by any malicious persons.

In the accompanying drawings, Figure 1 is a perspective view of the back of a car-seat embodying our improvements, it being represented in its customary or elevated position. Fig. 2 is a perspective view of the front of our seat in its depressed or recumbent position.

A represents the body of our device, provided with a cushioned seat, B, and back C, and the front part of said body is connected to the rail D by means of suitable hinges, E E', the rail D being supported on legs F F' F² F³.

Secured to the back of the frame D are two adjustable supports, G G', each of which consists of duplex arms H H' and I I', these arms being provided with pockets $h\ h'$ and $i\ i'$, for a purpose which will be presently explained.

J J' are locking devices attached to the back of the body A, and they are provided with bolts or catches $j\ j'$, which engage with either of the pockets $h\ h'$ or $i\ i'$, according to the position of the seat, whether it be elevated or depressed.

These bolts may be screw-threaded and provided with suitable heads, so that they may be operated by a key in the possession of the conductor; but, if preferred, the screw-threaded bolts may be omitted and a simple spring-catch substituted for them.

The diagonally-opposite legs F' F³ are provided with sockets $f\ f$ for the reception of the anchoring-pins K K', and the seat is secured to the floor of the car by means of the hook L, nut $l$, and staple N, the latter being a fixture.

O O' are foot-boards, and P a boot-jack attached to the back of the frame D for the convenience of the passenger who occupies a seat immediately in the rear.

The foot-boards O O', instead of being permanently secured to the frame, may be attached to it in such a manner as to enable its being elevated and depressed or moved in or out, so as to suit the convenience and comfort of any passenger.

When it is desired to use our device as a customary car-seat the body A is sustained by the arms H and I of the adjustable supports G G', as shown in Fig. 1, in which position the bolts or catches $j\ j'$ engage with the pockets $h$ and $i$ of said arms, and thus retain the body of the seat securely in its elevated position.

The occupant having become wearied of riding in this position, the conductor or other attendant, who retains possession of the key, has only to unlock the catches $j\ j'$, raise the body A so as to free it from the arms H and I, and allow the supports G G' to drop, thereby presenting their short arms H' and I' upward when the body A is lowered, and the catches $j\ j'$ are locked into the pockets $h'$ and $i'$ of said arms, which at once converts the seat into the reclining-lounge, as clearly shown in Fig. 2.

When the seat is in this last position the passenger, by resting his feet on the foot-boards O O', will occupy such an easy position that he will be enabled to sleep as comfortably as if he was in bed, and travelers in cars provided with our improved seats are thus enabled to make a trip of a great distance without any fatigue whatever.

The key which operates the catches $j\ j'$ being in the possession of the conductor or some responsible attendant, the seats are more apt to be kept in order and not so liable to be damaged as they would be if every passenger was at liberty to change the position of his own seat.

The cars having arrived at their destination, and it being necessary to reverse the position of the seats, it can be effected in a few minutes in the following manner: The nut $l$ is first unscrewed, thus liberating the hook L from the staple N, after which the entire seat is lifted and turned completely around, so that the anchoring-pin K, which previously occupied the socket $f$, now enters the one $f'$, and the other pin, K', engages with the other socket, $f$. The hook L is now caused to engage with the staple N, and the nut $l$ being screwed up the seat is firmly secured in its reversed position. The adjustable supports G G', instead of being rigidly attached to the rail D, may be provided with a stem which could rest upon a spiral or rubber spring contained in a suitable socket in the rear of said frame D.

We claim herein as new and of our invention—

1. A car-seat composed of two distinct parts, to wit: the body A and supporting-frame D, when hinged or otherwise connected together, substantially as herein described, and for the purpose set forth.

2. In combination with the body A and supporting-frame D, the adjustable supports G G', and locking device J J', all arranged as and for the purpose explained.

3. In combination with the elements of the first claim, the sockets $ff$, anchoring-pins K K', hook L, and staple N, to enable the reversal of the seat, and securing it in either position, in the manner described.

In testimony of which invention we hereunto set our hands.

MARK M. MARTIN.
FRANK MARTIN.

Witnesses:
GEO. H. KNIGHT,
JAMES H. LAYMAN.